Jan. 12, 1965   H. J. FERRIS   3,165,322
MATERIAL UNLOADER AND SPREADER WITH EXTENSIBLE FLAILS
Filed March 6, 1963   2 Sheets-Sheet 1
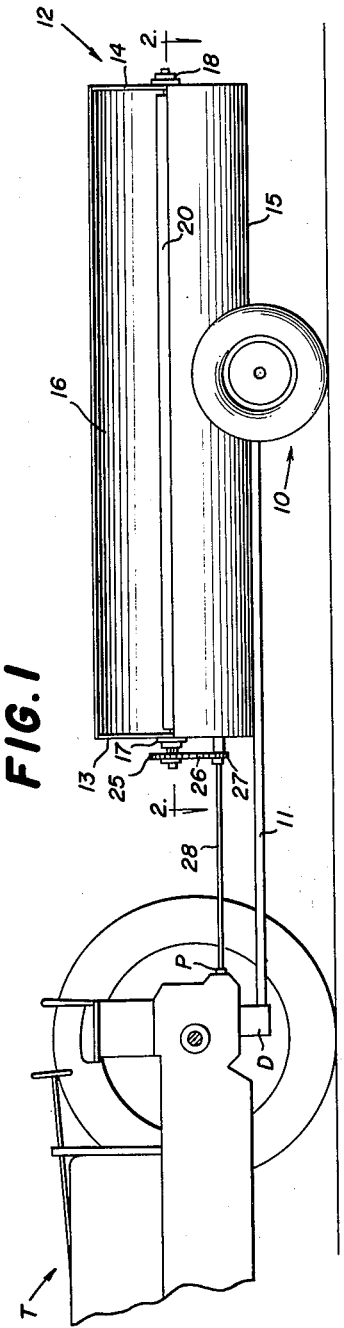
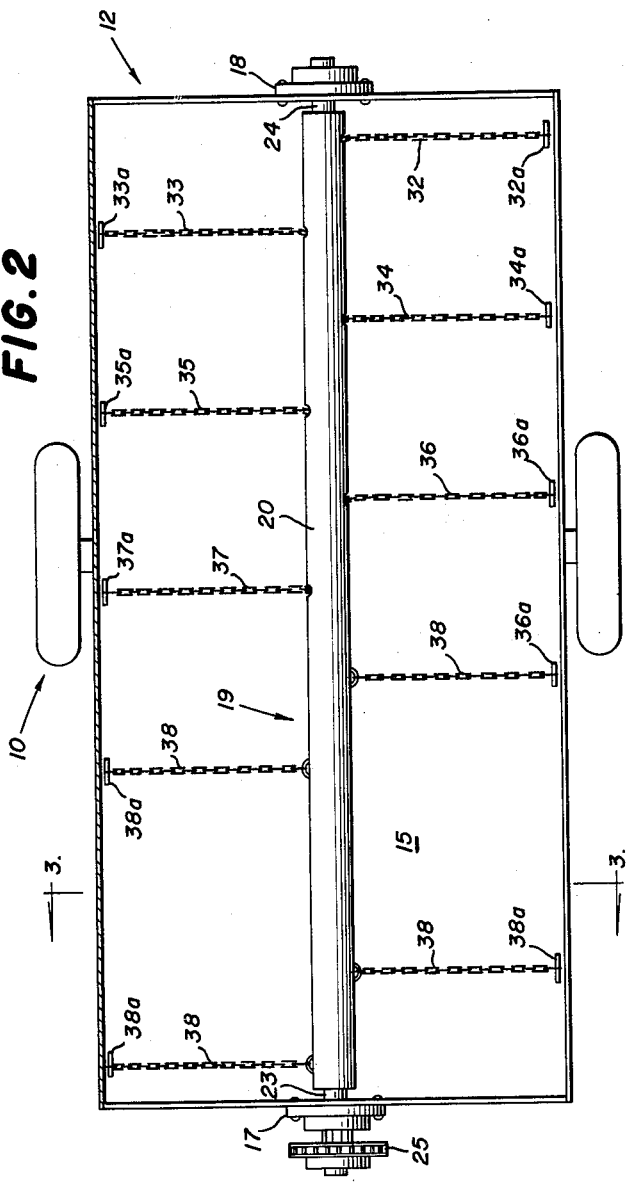
INVENTOR.
HOWARD J. FERRIS
BY
Hofgren, Wegner, Allen,
Stellman & McCord
ATTYS.

Jan. 12, 1965   H. J. FERRIS   3,165,322
MATERIAL UNLOADER AND SPREADER WITH EXTENSIBLE FLAILS
Filed March 6, 1963   2 Sheets-Sheet 2
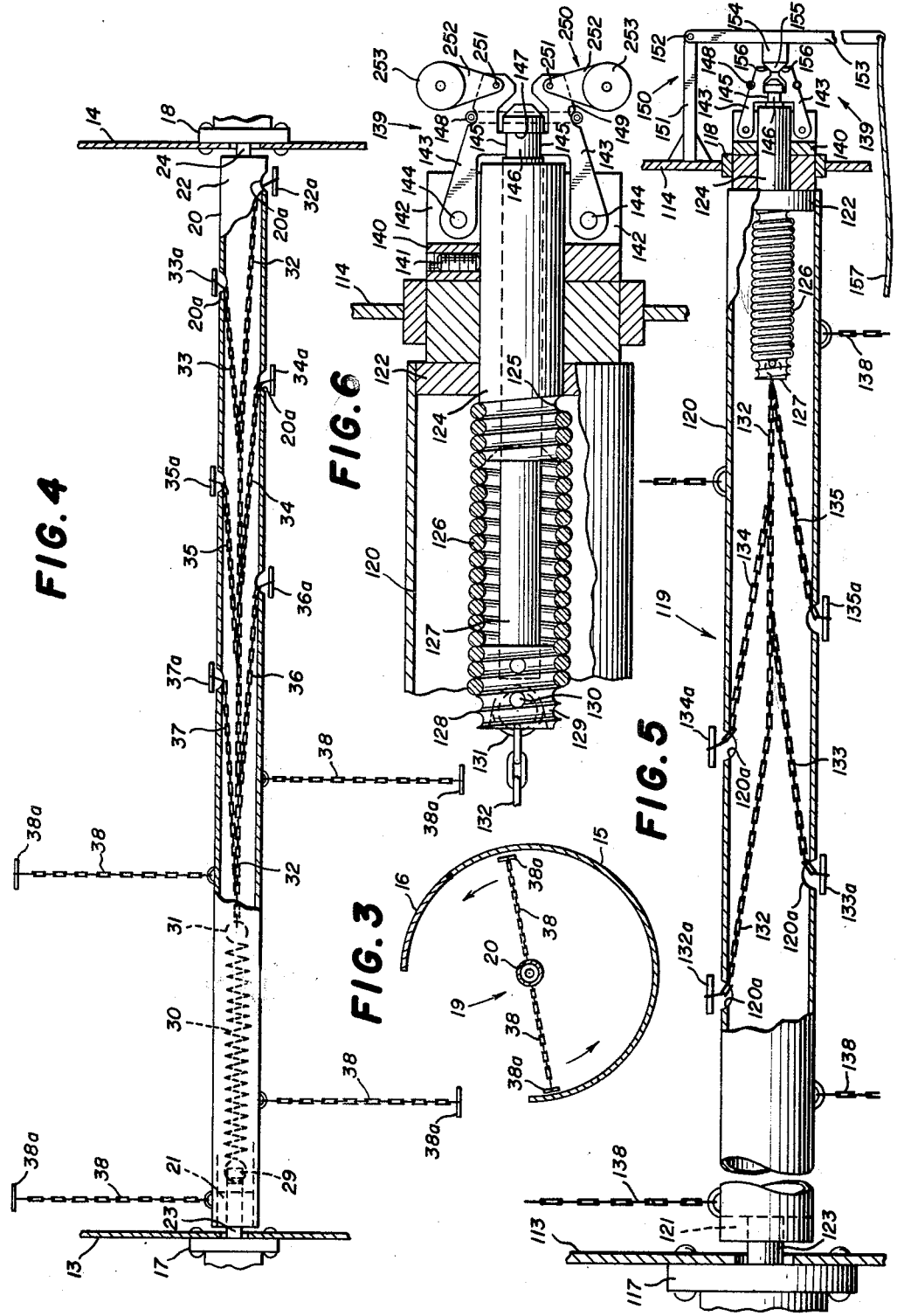

United States Patent Office 3,165,322
Patented Jan. 12, 1965

3,165,322
MATERIAL UNLOADER AND SPREADER WITH
EXTENSIBLE FLAILS
Howard J. Ferris, Gulfport, Fla., assignor to
Starline Inc., a corporation of Illinois
Filed Mar. 6, 1963, Ser. No. 263,308
8 Claims. (Cl. 275—3)

This invention relates to a flail type material unloading and spreading device, and in particular it relates to such a device in which the unloader shaft is provided with means for extending the flails progressively as material is unloaded from the container.

The present invention is directed to material spreaders of the type disclosed and claimed in Elwick Patent 2,886,-332, and the principal object of the invention is to provide a mechanism which helps to even out the power requirements of the unit from the beginning to the end of an unloading cycle.

Material spreaders of the present type are used principally for spreading refuse on farm fields, and accordingly, they are most commonly drawn behind a farm tractor and the unloader shaft is driven from the tractor power take-off. The refuse is usually heaped a substantial distance above the unloader shaft, so the starting load on the power take-off is quite large and decreases as the material is discharged from a container. It is clear that the device is adaptable for use with smaller tractors if something can be done to even out power requirements from the beginning to the end of an unloading power cycle.

Reduction in the load differential during an unloading cycle is accomplished in accordance with the present invention by a novel combination of means which contribute two separate factors toward the desired end result. In the first place, one group of flexible flail members is mounted for retraction within a hollow shaft, and the flail members of this group are held retracted by a tension spring which may extend to feed the flail chains out of the shaft only when centrifugal force upon the flail plates which are outside the hollow shaft reaches a predetermined level. In one embodiment of the invention, suitable for use with a tractor having a single speed power take-off, a manually controlled latch is provided which prevents extension of the spring until an operator releases the latch. In another embodiment the stiffness of the spring is such that it cannot extend until a power takeoff is rotating the shaft above a predetermined speed, and in a third embodiment the latch is controlled by a centrifugal governor which releases only when the shaft is rotating above a predetermined speed.

In combination with the spring retracted flails, a second group of flails may be mounted directly upon the unloader shaft in the usual way, so that the only control over the extension of these flails with respect to the shaft is provided by the unloading of material from the areas of the container in which these flails operate. Thus, in the operation of the unit the spring retracted flails are initially held within the hollow shaft except for their flail plates, and only the group of flails mounted directly upon the shaft is operative to unload material from the container. At a suitable time in the unloading cycle, the tractor power take-off may be shifted to higher speed, or in the manually latch controlled embodiment of the invention the manual latch may be released, to permit the spring controlled flails to extend.

The invention is illustrated in a first embodiment and two alternative embodiments in the accompanying drawings, in which:

FIG. 1 is a side elevational view of a material unloader and spreader embodying the invention, the unit being illustrated as connected to a farm tractor;

FIG. 2 is a sectional view of the spreader on an enlarged scale, taken substantially as illustrated along the line 2—2 of FIG. 1 with all the flails in extended position;

FIG. 3 is a section on a reduced scale taken substantially as illustrated along the line 3—3 of FIG. 2;

FIG. 4 is a fragmentary section on an enlarged scale with parts of the tubular unloader shaft broken away to illustrate the spring arrangement in a first embodiment of the invention;

FIG. 5 is a fragmentary section on an enlarged scale with parts of a tubular unloader shaft broken away to illustrate the spring arrangement in a second embodiment of the invention employing a manually controlled latch; and FIG. 6 is a fragmentary section on an enlarged scale illustrating a third embodiment of the invention which is similar to that of FIG. 5 but has a governor controlled latch.

Referring to the drawings in greater detail, and referring first to FIGS. 1 and 2, a wheeled carriage, indicated generally at 10, is provided with a tongue 11 by means of which the carriage may be connected to the drawbar D of a tractor T; and surmounting the carriage is a material container, indicated generally at 12.

The container 12 has front and rear end walls 13 and 14, an arcuate bottom wall 15, and a hinged hood 16 which may be swung outwardly to facilitate loading the container.

Front and rear self-aligning bearings 17 and 18 are mounted, respectively, in the end walls 13 and 14 of the container and support an unloader assembly indicated generally at 19. As best seen in FIGS. 2 and 4, in the first embodiment of the invention the unloader assembly includes a tubular shaft 20 having front and rear headers 21 and 22, respectively, and reduced end shafts 23 and 24 extend outwardly from the headers and are journaled in the front and rear bearings 17 and 18, respectively. As seen in FIGS. 1 and 2, the front shaft 23 extends through bearing 17 and carries a sprocket 25 which is driven by a chain 26 from an input sprocket 27 on a shaft 28 that is connected to a power take-off P of a tractor T. For proper functioning of the first embodiment of the invention illustrated in FIG. 4, it is necessary that the power take-off P be of the variable speed type.

In FIG. 4, reduced shaft 23 pierces header 21 and has at its rear end, inside hollow shaft 20, an eye 29 into which is hooked one end of a tension spring 30 that is shown somewhat diagrammatically in its fully collapsed position. At the opposite end of the tension spring is an eye 31 to which is secured a chain 32 which extends substantially to the rear extremity of the hollow shaft 20 where its free end extends through an opening 20a in the hollow shaft and has a flail plate 32a secured to said free end outside the shaft. Secured at various points along the chain 32 are flail chains 33, 34, 35, 36 and 37, each of which extends through an opening 20a in the tubular shaft 20, and to the respective free ends of said chains are attached flail plates 33a, 34a, 35a, 36a and 37a. The space between the points of attachment of adjacent chains, such as 33 and 34, to the chain 32, is approximately equal to the distance between the opening 20a.

In addition to the flails just described as attached to the tension spring 30, the front portion of the shaft is provided with a plurality of chain flails 38 which are secured directly to the exterior of the hollow shaft 20 much as are the flails in Elwick Patent 2,886,332.

In the present embodiment of the invention, the tension spring 30 is of such strength that it retains the flail chains 32 to 37, inclusive, in the retracted position of FIG. 4 until the speed of rotation of the hollow shaft 20 produces sufficient centrifugal force on the flail plates to extend the tension spring. Thus, the stiffness of spring 30 may be so calculated that it retains the flails in their retracted positions until the tractor power take-off is driven at a certain predetermined speed, at which point the centrifugal force on the flails is sufficient to extend the spring. In the meantime, however, the flails 38 have served to remove material from that area of the container in which they are positioned.

The second form of the device, illustrated in FIG. 5, and the third form, illustrated in FIG. 6, are identical except that the second form has a manually controlled latch while the third form has a governor controlled latch. Accordingly, the two forms will be initially described with respect to both FIGS. 5 and 6, since certain of the common structural details are illustrated only in FIG. 6.

Referring now to FIG. 5, container front and rear walls 113 and 114 are provided, respectively, with bearings 117 and 118; and an unloader assembly, indicated generally at 119, includes a hollow unloader shaft 120 having front and rear headers 121 and 122 from which reduced shafts 123 and 124 extend, respectively, through the front and rear bearings 117 and 118.

Referring now particularly to FIG. 6, it is seen that the rear reduced shaft 124 is in the form of a tube and has its inner end portion positioned internally of the header 122 where it has an external helical groove 125 on which a few turns of a tension spring 126 may be screwed, so that the shaft 124 provides a hollow spring connector. Slidably mounted in the sleeve 124 is a spring control rod 127 at the forward end of which is an enlarged head 128 having a helical groove 129 to receive a few turns at the forward end of tension spring 126. A cross-pin 130 in a recess at the front of enlarged head 128 carries an eye 131 to which is secured a flail chain 132 that corresponds to the flail chain 32 in the first form of the device, illustrated in FIG. 4. Additional flail chains 133, 134 and 135 are seen in FIG. 5 to be fastened to the chain 132, and all said chains extend through openings 120a in the hollow shaft 120 and carry respective flail plates 132a, 133a, 134a and 135a. The unloader assembly 119 also is provided with flail chains 138 secured directly to the hollow shaft 120, and as seen in FIG. 5, in this embodiment of the invention there are flail chains 138 both adjacent the forward wall 113 and immediately adjacent the rear wall 114.

It is apparent from the foregoing description and particularly from FIG. 6, that centrifugal force acting upon the flail plates places an endwise pull upon the spring 126 and tends to elongate the spring and slide the spring control rod 127 endwise through the sleeve 124. This action is controlled by a latch assembly, indicated generally at 139. A collar 140 which is fixed to the sleeve 124 by a set screw 141 carries a pair of opposite, radially extending brackets 142 to which latch arms 143 are pivoted at 144. Opposed inwardly extending latch lugs 145 on the arms 143 engage opposite sides of a circumferential groove 146 which is formed in the rear of spring control rod 127 to the rear of the sleeve 124. A shoulder 147, which defines the rear margin of groove 146, engages the latch lugs 145 to latch the spring control rod 127 in its rearward position and thus prevent elongation of spring 126. A garter spring 148 is seated in circumferentially extending, aligned grooves 149 in the latch arms 143 to normally maintain the latch lugs 145 in the groove 146.

In the form of the device illustrated in FIG. 5, the operation of latch assembly 139 is controlled by manual control means, indicated generally at 150. A mounting arm 151 is secured to rear container wall 114 and extends rearwardly therefrom, and its outer end carries a pivot 152 for a latch operating lever 153 having a latch operating cam lug 154. The cam lug has a frusto-conical forward end 155 which extends between a pair of inclined cam faces 156 at the rear of the latch arms 143. A control cord 157 secured to the free end of latch control lever 153 extends forwardly to a position where it may be pulled by an operator on the tractor T, and such a pull pivots the lever about the point 152 to force the cam surface 155 between the cam faces 156 and pivot the latch arms 143 against the tension of garter spring 148 to withdraw the latch lugs 145 from the groove 146. When this is done, if the centrifugal force upon the flail plates is sufficient it elongates the spring 126 and permits the flail chains 132 to 135, inclusive, to pay out through the holes 120a in the hollow shaft 120.

Referring now to the latch control mechanism of FIG. 6, which is indicated generally at 250, pins 251 in the rear ends of latch arms 143 carry pivotally mounted, flywheel type governor members 252 at the outer ends of which are weights 253. It is apparent that the centrifugal governor type control of FIG. 6 must be so calibrated that when the tractor power take-off P is operating at low speed the tension of garter spring 148 is sufficient to overcome the radial pull of the governor weights 253; while operation of the power take-off above a predetermined speed permits the force exerted by the governor weights to expand garter spring 148 and withdraw the latch lugs 145 from the groove 146.

The foregoing detailed description is given for clearness of understanding only and no unnecessary limitations should be understood therefrom, as modifications will be obvious to those skilled in the art.

I claim:

1. A material spreader comprising, in combination: a wheeled carriage; a material container on the carriage, said container having two end walls and an arcuate wall secured to said end walls to provide the bottom and sides of the container, and the bottom of said container being between the wheels so that the container is generally parallel to a supporting surface; a rotatable, hollow unloader shaft extending longitudinally of the container, said shaft having a plurality of longitudinally spaced openings; extensible means including a tension spring within and having an end secured adjacent an end of the shaft; attaching means secured to the other end of the extensible means; and a plurality of flexible flail members each of which has one end connected to said attaching means and a free end extending through one of said openings, there being a flail plate on the free end of each flail member, said extensible means being adapted to extend in response to the pull of said flail members resulting from centrifugal force on the flail plates, whereby the flexible members are normally entirely within the shaft and project outwardly in response to extension of the spring.

2. The device of claim 1 in which the flail members include a first flexible member secured directly to the attaching means and extending out the opening which is most remote from said attaching means, and a plurality of additional flexible members secured to different points along said first member which are spaced apart by substantially the distance between adjacent openings in the unloader shaft.

3. A material spreader comprising, in combination: a wheeled material container having two end walls and an arcuate wall secured to said end walls to provide the bottom and sides of the container; a rotatable hollow unloader shaft extending longitudinally of the container, said shaft having a plurality of longitudinally spaced openings; extensible means including a coil tension spring within and having an end secured adjacent an end of the shaft; attaching means secured to the other end of the extensible means; and a plurality of flexible flail members each of which has one end connected to said attaching means and a free end extending through one of said openings, there being a flail plate on the free end of each flail member, said extensible means being adapted to extend in response to the pull of said flail members resulting from centrifugal force on the flail plates; a latch rod extending longitudinally through the spring and secured to the free end thereof; and latch means releasably engageable with said latch rod to latch the rod and the free end of the spring against longitudinal movement.

4. The device of claim 3 in which the latch rod has a circumferential shoulder, the latch means includes a plurality of radially movable lugs engaged with said shoulder, means are provided urging the lugs into engagement with the shoulder and release means are provided for withdrawing the lugs from said engagement.

5. The device of claim 4 in which the release means includes a manual lever having a conical cam surface and the lugs are on arms which are pivoted for radial movement and have cam surfaces complementary with that on the lever, whereby movement of the lever cam surface between the arm cam surfaces pivots the arms to withdraw the lugs from engagement with the shoulder.

6. The device of claim 4 in which the lugs are on arms which are pivoted for radial movement, and ball-governor means are mounted on said arms to pivot said arms outwardly when centrifugal force on the governor reaches a predetermined level.

7. The device of claim 4 which includes a hollow spring connector secured to and extending inwardly from an end of the shaft, the inner end portion of said connector having an external helical groove, several turns of the spring are threaded into said groove, the latch rod extends through said hollow connector and has an inner end provided with an external helical groove, and the free end of the spring has several turns threaded into the helical groove in the rod.

8. The device of claim 4 which includes a hollow spring connector secured to and extending inwardly from an end of the shaft, the latch rod extends through said hollow connector, the shoulder on the rod is outside the hollow shaft and spaced from the shaft end, and the lugs are on arms which are pivotally mounted on the end of the hollow shaft for radial movement with respect to the latch rod.

References Cited in the file of this patent

UNITED STATES PATENTS

| | | |
|---|---|---|
| 582,210 | La Rue | May 11, 1897 |
| 2,228,421 | Taylor | Jan. 14, 1941 |
| 3,004,765 | Wilkes | Oct. 17, 1961 |